United States Patent [19]

Kimiavi et al.

[11] Patent Number: 5,572,553
[45] Date of Patent: Nov. 5, 1996

[54] DIGITAL APPARATUS FOR BROADBAND CARRIER-RECOVERY

[75] Inventors: Mani Kimiavi, Paris; Alain Fargues, Conflans Ste Honorine, both of France

[73] Assignee: Alcatel Telspace, Nanterre Cedex, France

[21] Appl. No.: 396,724

[22] Filed: Mar. 1, 1995

[30] Foreign Application Priority Data

Mar. 16, 1994 [FR] France .................................. 94 03059

[51] Int. Cl.⁶ .................................................. H04L 27/233
[52] U.S. Cl. ........................... 375/344; 375/326; 455/265
[58] Field of Search ...................... 375/344, 326; 455/208, 258, 265

[56] References Cited

U.S. PATENT DOCUMENTS

| | | | |
|---|---|---|---|
| 3,931,575 | 1/1976 | Amoroso, Jr. ........................... | 375/344 |
| 4,691,377 | 9/1987 | Yoshihara et al. ...................... | 375/344 |
| 5,495,510 | 2/1996 | Kimiavi ................................ | 375/371 |

FOREIGN PATENT DOCUMENTS

0291947A2  11/1988  European Pat. Off. .

OTHER PUBLICATIONS

*IEEE International Conference On Communications, 1990*, 15–19 Apr. 1990, Georgia US, IEEE, NY, US 1990, pp. 1418–1422, Takenaka et al, "A Digital Signal Processing Demodulator with a Wide Frequency Acquisition Range".

*Primary Examiner*—Stephen Chin
*Assistant Examiner*—Jeffrey W. Gluck
*Attorney, Agent, or Firm*—Sughrue, Mion, Zinn, Macpeak & Seas

[57] ABSTRACT

A method of controlling a digital carrier recovery apparatus designed to be integrated in a demodulation stage of a receiver for receiving a digital signal. The demodulation stage includes a carrier recovery detection apparatus. The carrier recovery detection apparatus includes a loop filter including a summing circuit followed by a bistable circuit operating in time with the symbol time, and a switching device disposed between the summing circuit and the bistable circuit. The switching device is driven to alternately apply to the bistable circuit a control word, whose variation between two successive applications to the bistable circuit is less than the acquisition band of the carrier recovery apparatus, and the output signal of the summing circuit. By alternately applying the control word and the output signal, the acquisition band is displaced relative to the tracking range of the carrier recovery apparatus.

2 Claims, 3 Drawing Sheets

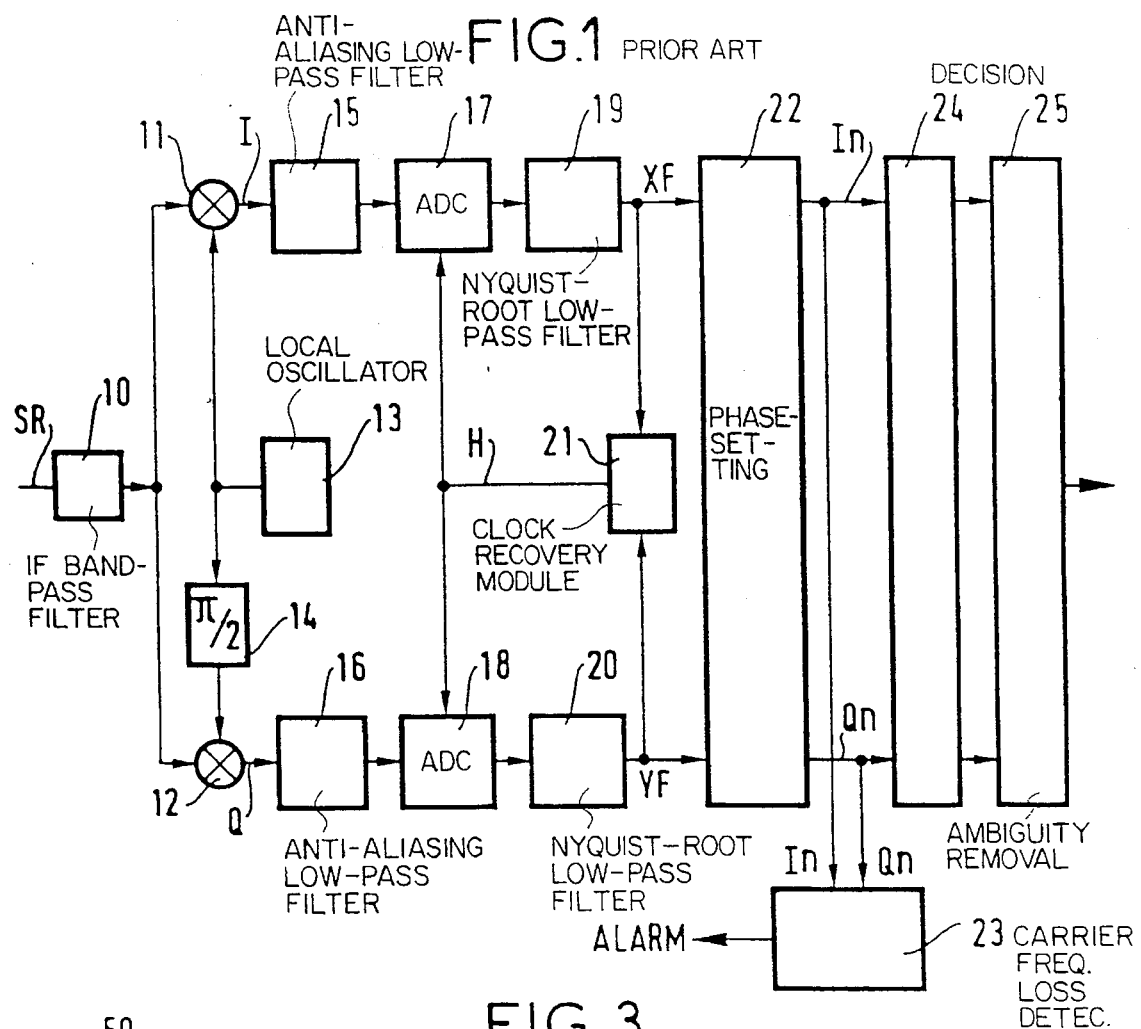
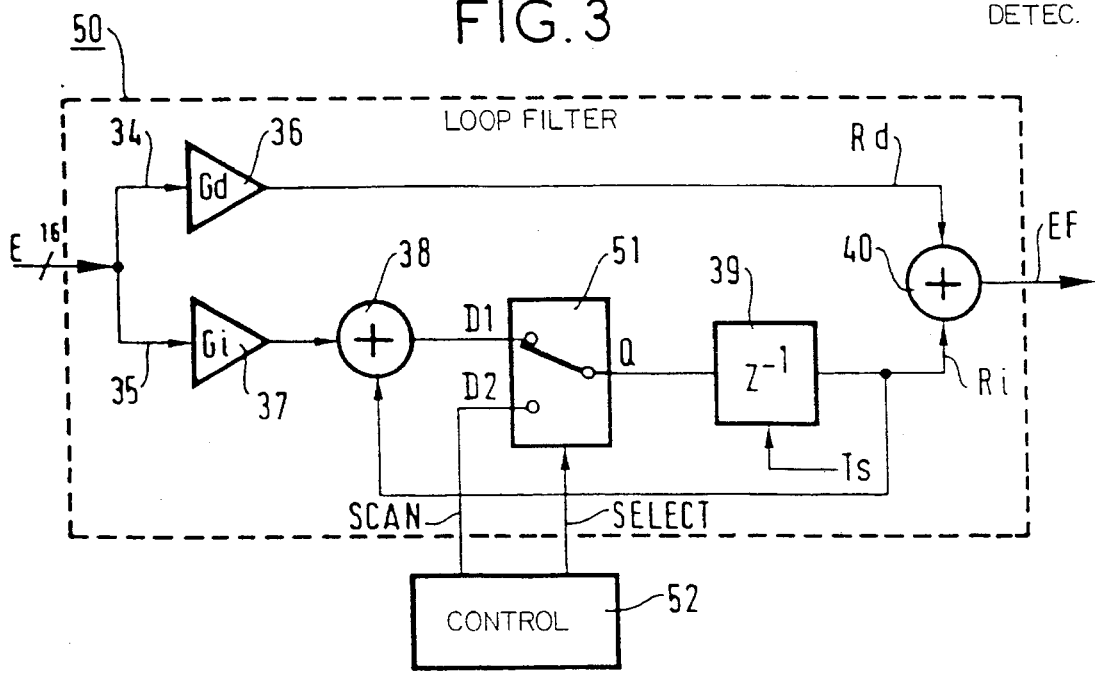

DIGITAL APPARATUS FOR BROADBAND CARRIER-RECOVERY

The present invention relates to digital apparatus for broadband recovery of a carrier frequency. More precisely, the invention relates to a method of controlling a digital phase-locked loop serving as carrier recovery apparatus for carrier recovery over a wide frequency range.

The phase-locked loop of the invention is designed to be incorporated in a demodulation stage for demodulating a signal constituted by two quadrature modulated digital trains. Such a demodulation stage is shown in FIG. 1.

BACKGROUND OF THE INVENTION

FIG. 1 is a block diagram of a conventional digital demodulation stage, e.g., as described in French Patent Application No. 93 00051 filed on Jan. 6, 1993.

A received signal referenced SR and constituted by a quadrature modulated signal is applied to the input of an intermediate frequency band-pass filter 10 followed by two multipliers 11 and 12 which multiply the signal output from the filter 10 by two signals in quadrature. One of these signals is output directly from a local oscillator 13, and the other signal is output from a π/2 phase-shifter 14. The local oscillator 13 generates a signal having the same frequency as the center frequency of the received signal SR. The output signals from the multipliers 11, 12 constitute two base-band components I and Q. These components are applied to anti-aliasing low-pass filters 15 and 16 followed by analog-to-digital converters 17 and 18 supplying respective digital components XF and YF, e.g., quantized into 6 bits. The converters 17 and 18 are followed by Nyquist-root low-pass filters 19 and 20 whose outputs are applied to a clock recovery module 21 supplying a clock signal H driving the converters 17 and 18. Carrier recovery apparatus 22 constituted in the above-mentioned application by phase-setting apparatus also receives the components XF and YF.

The function of the phase-setting apparatus 22 is to rotate the constellation of phase states of the received signal as a function of data representative of the difference in angle of the constellation. Apparatus 22 supplies two digital data trains In and Qn constituting a received symbol at each symbol time Ts. The position of each symbol in the constellation is defined by its coordinates XF and YF obtained by quantizing the analog data trains I and Q.

Apparatus 22 may optionally supply the digital trains In and Qn to detection apparatus 23 for detecting carrier frequency loss, such as the apparatus described in French Patent Application No. 93 15086 filed on Dec. 15, 1993. Other types of detection apparatus may also be used for detecting carrier frequency loss.

The components In and Qn are also applied to a decision member 24, enabling a symbol to be associated with each pair of phase-set components. Member 24 is followed by ambiguity removal apparatus 25, making it possible to remove the uncertainty resulting from decision-taking and thus to determine the correct symbol.

Carrier recovery must be performed in particular when starting up a modem. Various solutions are suitable for implementing the carrier recovery apparatus 22. The drawbacks with existing analog solutions are that they require adjustment, and that certain parameters drift with temperature.

Digital solutions are preferred since they do not suffer from those drawbacks, and they offer the advantage of being more stable and reliable. An entirely digital known solution for implementing the carrier recovery apparatus is described in French Patent Application No. 93 00051. That solution uses a phase-locked loop such as the loop described with reference to FIG. 2.

FIG. 2 shows a phase-locked loop performing the function of the carrier recovery apparatus 22 of FIG. 1.

The components XF and YF, e.g. quantized on 6 bits, are applied to a correction module 30 for rotating the constellation of the phase states of the received signal SR as a function of data sinθc and cosθc representative of the difference in angle between the ideal constellation and the constellation of the phase states of the received signal SR.

In the phase plane, this is equivalent to rotating the vector whose digital quadrature components XF, YF are those obtained at the outputs of the low-pass filters 19 and 20 of the demodulation stage. The components In and Qn of the vector resulting from this rotation are associated with a point that coincides with one of the points of the constellation of the ideal phase states.

The correction module 30 multiplies the pair of components XF and YF by a rotation matrix whose different sets of coefficients are stored in a memory module 31. The components In and Qn output by module 30 are applied to a phase error detector 32, making it possible to estimate the instantaneous phase difference between two successive pairs of components XF and YF, and supplying a phase error referenced E, where:

$$E = In.Qn.(In+Qn).(In-Qn)$$

This phase error E may also be written as follows:

$$E = \rho^4 \sin 4\alpha$$

where ($\rho$, $\alpha$) are the polar co-ordinates that correspond to the Cartesian co-ordinates (In, Qn). This error E cancels for $\alpha \in \{\pi/4, 3\pi/4, 5\pi/4, 7\pi/4\}$, i.e., when there is no rotation of the constellation.

The phase error E is supplied to a loop filter 33 of the low-pass type (of second order in this example) including two processing paths 34 and 35. The first path 34 includes an attenuator 36 which divides the phase error E by a coefficient Gd so as to supply a result Rd. The second path 35 includes an attenuator 37 which divides the phase error E by a coefficient Gi. For example, the coefficients Gd and Gi represent division by integer powers of two. The phase error is applied to a phase accumulator constituted by a summing circuit 38 followed by a bistable circuit 39 sequencing the operation in time with the symbol time Ts. The output of the bistable circuit 39 is looped back to the summing circuit 38 and supplies a result Ri.

The results Rd and Ri of the processing performed by the two paths 34 and 35 are applied to a summing circuit 40 so as to supply a filtered phase error indicator EF.

By appropriate choice of the gains Gi and Gd, the filter 33 makes it possible to suppress noise and in particular phase jitter.

The filtered phase error indicator EF is applied to a phase accumulator 41 comprising a summing circuit 42 followed by a bistable circuit 43 operating at the symbol time Ts. In this way, the filtered phase error indicator EF of the successive received symbols are totalled in the phase accumulator 41. The result of the totalling is angular difference data θc enabling the correction module 30 to bring the constellation of the received signal SR back into the appropriate position for subsequent decision-making.

The tracking range of such a phase-locked loop is determined by the size of the summing circuit 38, which is the number of bits in the summing circuit (e.g., 8 or 16 bits), and is therefore set for a given throughput.

The acquisition range is determined, in particular, by the gains Gi and Gd. These gains are adjusted such that the loop bandwidth is narrow, so as to suppress noise, but the acquisition range is then narrow. When the detection apparatus for detecting carrier frequency loss detects loss of carrier recovery synchronization, it is necessary to modify the gains so as to increase the acquisition range, thereby enabling the carrier frequency to be recovered. Unfortunately, the apparatus is then more sensitive to noise, and the error rate deteriorates.

Carrier frequency recovery needs to be performed in particular at the start of a call, and this poses a problem when the symbol rate is low because, in that case, the frequency difference to be made up by correcting the phase of the constellation might be greater than the acquisition range.

OBJECTS AND SUMMARY OF THE INVENTION

A particular object of the present invention is to mitigate that drawback.

More precisely, an object of the invention is to provide carrier recovery apparatus of the entirely digital type, making it possible to recover a carrier frequency, even a distant carrier frequency, without modifying the width of the acquisition range, and therefore without modifying the coefficients Gi and Gd.

To achieve this object, together with others that appear below, the invention provides a method of controlling digital carrier recovery apparatus designed to be integrated in a demodulation stage of a receiver for receiving a phase-modulated digital signal having at least two phase states. The carrier recovery apparatus includes a correction module for rotating the constellation of the phase states of the digital signal as a function of data representative of the difference in angle of the constellation. The data is formulated on the basis of a phase error signal output by a loop filter including a phase accumulator successively including a summing circuit switching means, and a bistable circuit. The demodulation stage also includes a carrier recovery detection apparatus. The method includes the step of driving the switching means so as to apply the following to said bistable circuit alternately.

First, a control word is applied whose variation between two applications to the bistable circuit is less than the acquisition band of the carrier recovery apparatus.

Second the output signal of said summing circuit is applied. Accordingly, the acquisition band relative to the tracking range of the carrier recovery apparatus is displaced until the carrier recovery detection apparatus indicates that the carrier is recovered.

BRIEF DESCRIPTION OF THE DRAWINGS

Other characteristics and advantages of the invention will appear on reading the following description of a preferred embodiment, given by way of non-limiting example, and with reference to the accompanying drawings, in which:

FIG. 1 is a block diagram of a digital demodulation stage of known type;

FIG. 3 shows an advantageous embodiment of the loop filter implemented in the invention.

MORE DETAILED DESCRIPTION

Figure 2:
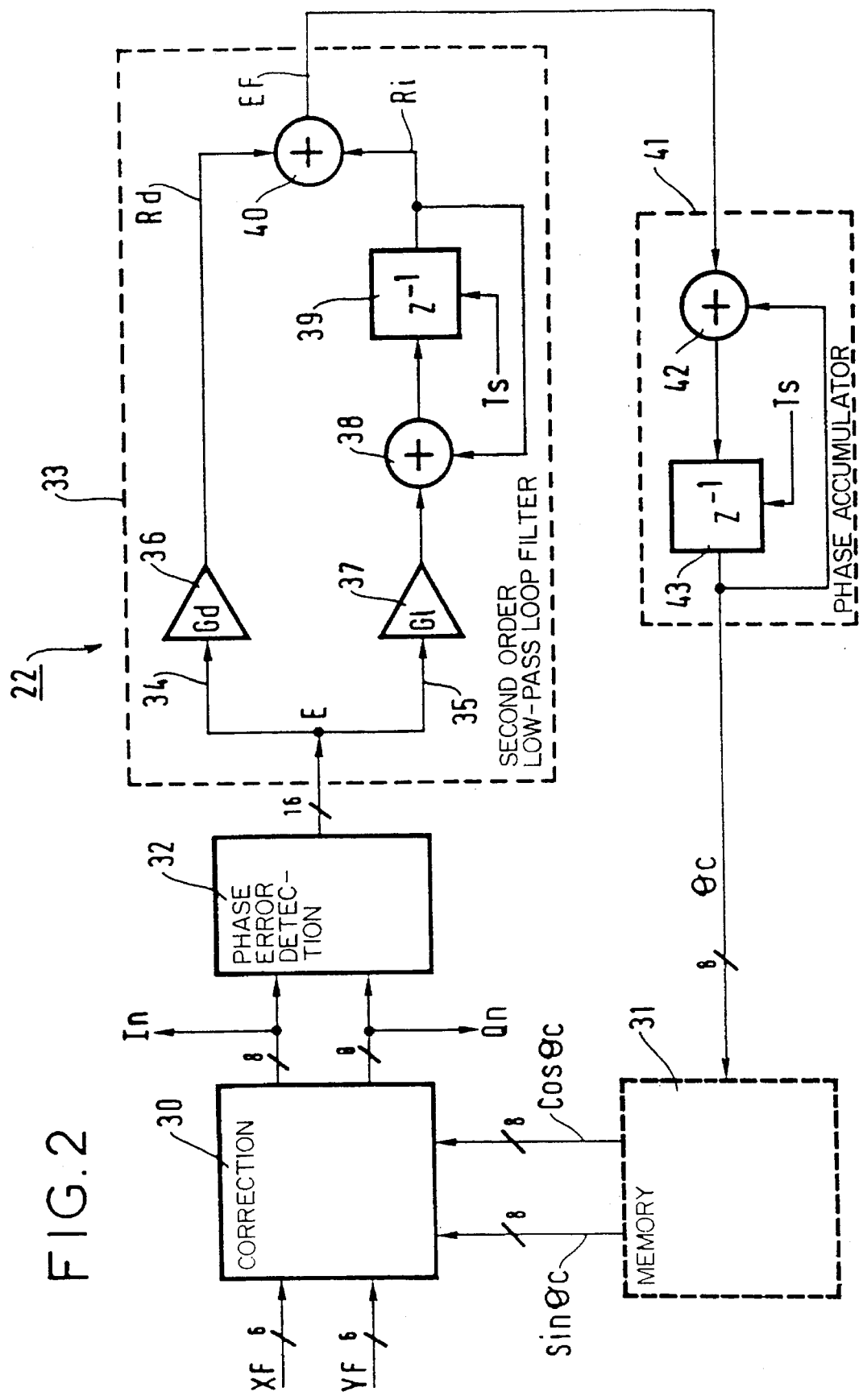
FIG. 2 shows a phase-locked loop performing the same function as the carrier recovery apparatus 22 of FIG. 1.

FIGS. 1 and 2 are described above with reference to the prior art.

The principle of the invention is to displace the acquisition band of the carrier recovery apparatus in small steps, so as to recover the carrier that is out of synchronization, thereby enabling subsequent decision-making. Unlike the state of the art, the width of the acquisition band is not modified (no action is taken on Gi and Gd), and, in this way, protection is provided against noise, while enabling carrier recovery to be performed over a wide frequency band. Such displacement of the acquisition band is achieved in the invention by replacing the loop filter shown in FIG. 2 with the filter shown in FIG. 3.

FIG. 3 shows an advantageous embodiment of a loop filter that may be implemented in the present invention. Elements that are identical to elements shown in FIG. 2 have the same references.

The loop filter, referenced 50, differs from the loop filter described with reference to FIG. 2 in that the phase accumulator includes switching means 51 placed between the summing circuit 38 and the bistable circuit 39. The output signal from the summing circuit 38 is applied to an input D1 of the switching means 51, and a control word SCAN is applied to input D2 of the switching means. The switching means are driven by a signal SELECT indicating which input must be switched to the output Q connected to the bistable circuit 39. A control member 52 supplies the signals SCAN and SELECT. The control member may, in particular, receive the signal ALARM described in above-mentioned Patent Application No. 93 15086 and as shown in FIG. 1.

The method of the invention consists in alternately applying the control word SCAN and the output signal from the summing circuit 38 to the bistable circuit 39. The control word SCAN is preferably also quantized into 16 bits and, between two successive applications, it is essential for its value to vary by a step-size that is less than the acquisition band of the carrier recovery apparatus. By successively increasing or decreasing the value of SCAN by a step-size which corresponds to a value that is less than the acquisition band of the carrier recovery apparatus, it is possible to ensure that the entire tracking band of the apparatus has been scanned, and therefore that the carrier frequency has been recovered, within the limits of the tracking range. The fact that the carrier frequency has been recovered is indicated by the carrier recovery detection apparatus. The scanning performed therefore consists in applying a digital ramp to the input of the phase accumulator.

Figure 4:
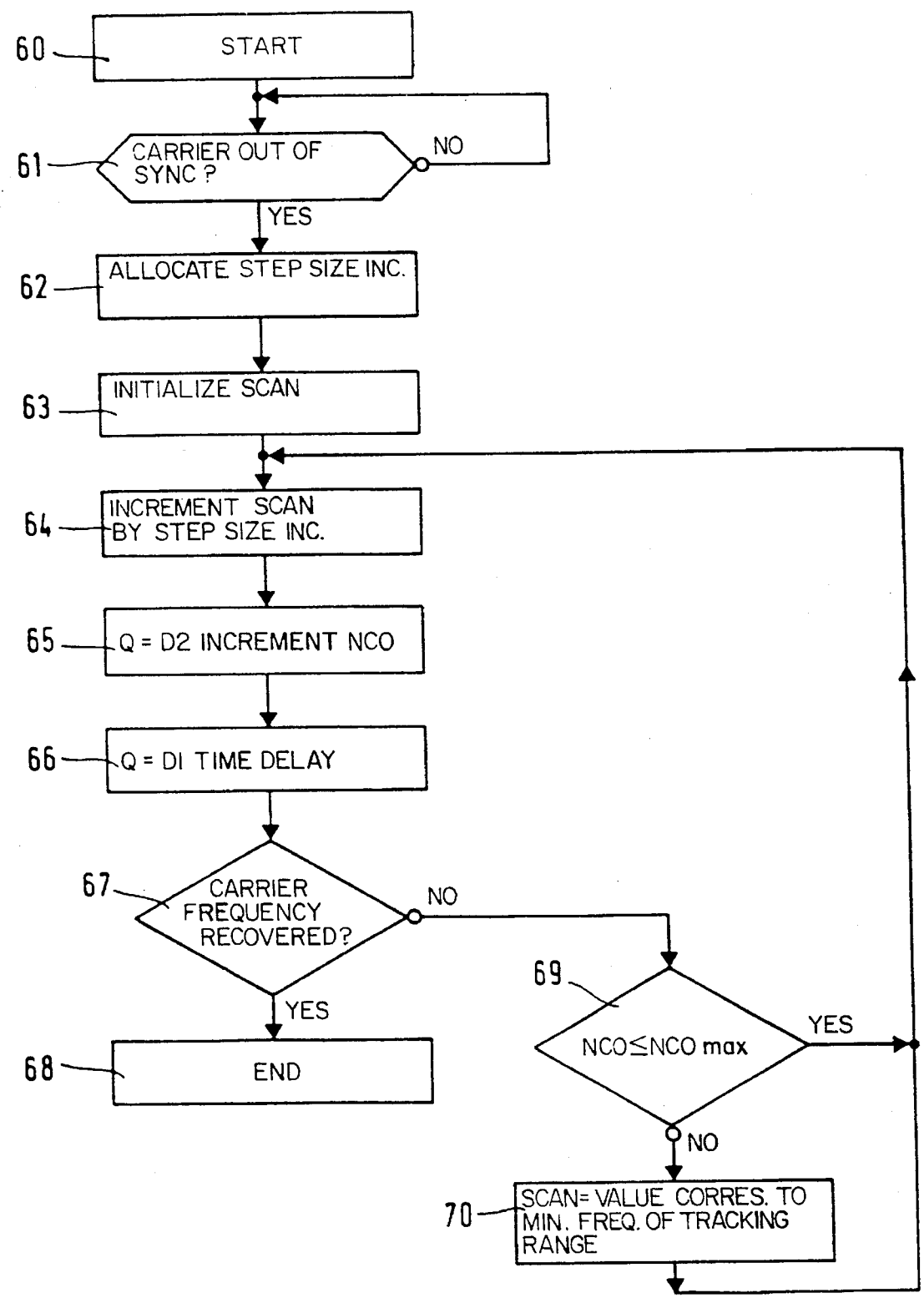
FIG. 4 is a flow chart showing various processing steps implemented to control the loop filter of FIG. 3.

Operation of the filter will be better understood upon reading the following description of FIG. 4, which is a flow chart showing various processing steps implemented in the control member 52 for controlling the loop filter of FIG. 3.

The processing performed at each step of the method is given in the following table.

| Steps | Processing |
|---|---|
| 60 | Start |
| 61 | Carrier recovery out of sync? |
| 62 | Allocate a value to the step-size INC |
| 63 | Initialize the value of the SCAN |
| 64 | Increment SCAN by INC |
| 65 | Q = D2, increment the NCO |
| 66 | Q = D1, apply time-delay |
| 67 | Carrier frequency recovered? |
| 68 | End |
| 69 | NCO value ≦ NCOmax? |
| 70 | SCAN = value corresponding to minimum frequency of tracking range |

Step 60 is a start step. At step 61, the control member 52 determines whether the carrier recovery apparatus is out of synchronization by means of the data ALARM supplied by the carrier frequency recovery detection apparatus. If the answer is "yes", in step 62, a value is allocated to the step-size, referenced INC, corresponding to the difference between two SCAN values successively applied to the switching means 51. At step 63, a value is determined for SCAN that corresponds to SCANref-INC, where SCANref is a control word corresponding to the middle of the tracking range. At step 64, the control word SCAN is incremented by INC. At step 65, the control word SCAN is applied to input D2 of the switching means 51, and SELECT is activated so that Q is equal to D2. The phase accumulator (a numerically-controlled oscillator (NCO)) is then incremented by INC. At step 66, SELECT is activated so that Q is equal to D1, and a time-delay is triggered so as to give enough time to the carrier recovery apparatus to acquire the value that is applied to it. A test is then triggered at step 67 in which apparatus 23, shwon in FIG. 1, is consulted so as to establish whether or not the carrier has been recovered. If it has been recovered, step 68 ends the procedure. If the carrier frequency has not been recovered, step 69 tests whether the maximum of the tracking range has been reached, i.e., whether the maximum value of the summing circuit 38 has been reached. If it has not been reached, the procedure is run again from step 64. Otherwise, at step 70 SCAN is set at its minimum value corresponding to the minimum frequency of the tracking range, before starting again from step 64.

By executing these steps, it is possible to scan the entire tracking range continuously starting from the middle of the range. Naturally, other scanning modes are possible, e.g., starting from one end of the range and going to the other end while complying with the step-size INC.

The test at step 67 may be executed by any carrier recovery detection apparatus, but preferably by apparatus such as the apparatus described in French Patent Application No. 93 15086 dated Dec. 15, 1993 is used.

The invention makes it possible, in particular to perform carrier recovery over a wide band and with low noise, without requiring adjustment, and in particular without acting on the coefficients Gi and Gd. The invention is applicable in particular to QPSK or 8-PSK type multiple-rate modems.

What is claimed is:

1. A method of controlling digital carrier recovery apparatus designed to be integrated in a demodulation stage of a receiver for receiving a phase-modulated digital signal having at least two phase states, said carrier recovery apparatus including a correction module for rotating the constellation of the phase states of said digital signal as a function of data representative of the difference in angle of said constellation, said data being formulated on the basis of a phase error signal output by a loop filter including a phase accumulator which includes a summing circuit, a bistable circuit, and switching means coupled between said summing circuit and said bistable circuit, said demodulation stage further including carrier recovery detection apparatus;

said method comprising the step of driving said switching means so as to perform the following steps alternatively:

a first step of applying, to said bistable circuit, a control word whose variation between two applications thereof to said bistable circuit is a value corresponding to less than the acquisition band of said carrier recovery apparatus; and a second step of applying the output signal of said summing circuit to said bistable circuit;

said first and second applying steps being alternately performed to displace said acquisition band relative to the tracking range of said carrier recovery apparatus until said carrier recovery detection apparatus indicates that said carrier is recovered.

2. A method of controlling digital carrier recovery apparatus designed to be integrated in a demodulation stage of a receiver for receiving a phase-modulated digital signal having at least two phase states, said carrier recovery apparatus including a correction module for rotating the constellation of the phase states of said digital signal as a function of data representative of the difference in angle of said constellation, said data being formulated on the basis of a phase error signal output by a loop filter including a phase accumulator which includes a summing circuit, a bistable circuit, and a switch coupled between said summing circuit and said bistable circuit, said demodulation stage further including carrier recovery detection apparatus, said method comprising the step of:

determining whether said carrier recovery apparatus is out of synchronization with said phase-modulated digital signal;

performing the following steps when the determining step determines that said carrier recovery apparatus is out of synchronization:

first controlling said switch to apply a control word signal to said bistable circuit;

second controlling said switch to apply an output of said summing circuit to said bistable circuit;

determining whether said carrier recovery apparatus is in synchronization with said phase-modulated digital signal; and repeating the first and second controlling and synchronization determining step until said synchronization determining step determines that said carrier recovery apparatus is in synchronization with said phase-modulated digital signal.

* * * * *